United States Patent [19]

Suzuki

[11] 3,964,808

[45] June 22, 1976

[54] ALL-PLASTIC HOUSING FOR A SMALL COMPACT TAPE REPRODUCER AND RECORDER

[75] Inventor: Nobuo Suzuki, Sagamihara, Japan

[73] Assignee: Technical Incorporated, Japan

[22] Filed: Dec. 4, 1974

[21] Appl. No.: 529,401

[52] U.S. Cl. ................................. 312/8; 206/305; 206/328; 220/20; 312/7 R; 312/20; 312/351
[51] Int. Cl.² ........................................... G11B 1/00
[58] Field of Search ............ 312/7, 8, 20, 208, 223, 312/351; 206/328, 332, 305; 220/20; 360/93, 94, 96; 179/100.12 A, 100.41 R, 179

[56] References Cited
UNITED STATES PATENTS

| | | | |
|---|---|---|---|
| 2,057,116 | 10/1936 | Rubens | 312/7 R |
| 2,821,307 | 1/1958 | Linsley | 206/332 X |
| 3,016,132 | 1/1962 | Chaplin | 206/305 |
| 3,256,975 | 6/1966 | Puente | 206/328 |
| 3,549,224 | 12/1970 | Bindman et al. | 312/8 |
| 3,686,470 | 8/1972 | Stahlberg et al. | 360/96 X |
| 3,780,231 | 12/1973 | DeBell et al. | 360/96 |

FOREIGN PATENTS OR APPLICATIONS

| 1,112,551 | 5/1968 | United Kingdom | 360/96 |
|---|---|---|---|

Primary Examiner—Paul R. Gilliam
Assistant Examiner—Carl F. Pietruszka
Attorney, Agent, or Firm—Hill, Gross, Simpson, Van Santen, Steadman, Chiara & Simpson

[57] ABSTRACT

A housing for a small compact tape reproducer and recorder made of synthetic resin material which utilizes a portion of the housing as a chassis for mounting the operating mechanism of the machine and wherein at least one side of the chassis is formed as a folded portion of one of the housing walls which connects with other sections of the housing and has at least one side surrounded by a vertical wall which also serves as a wall for other sections of the chassis.

5 Claims, 3 Drawing Figures

ALL-PLASTIC HOUSING FOR A SMALL COMPACT TAPE REPRODUCER AND RECORDER

BACKGROUND OF THE INVENTION

1. Field of the Invention

This invention relates in general to an all plastic housing for a small compact tape reproducer and recorder.

2. Description of the Prior Art

In the magnetic tape reproducer and recorder, particularly in the small, compact tape recording/playing devices in which the various operations of winding, fast forward and rewind of the tape are accomplished by a single motor which serves as a driving power source, complex mechanisms for switching over of the power transmission means from one to the other modes are required to accomplish these operations. The operating mechanisms and the motor drive are arranged under very delicate friction effects and the rollers, capstan and changeover mechanisms must be very accurately positioned.

Thus in prior art structures to obtain stable, high-precision design it has been conventional to mount the various mechanisms on a metal chassis which was then mounted in a plastic housing. Thus, according to the prior art the metal chassis was fabricated and the moving and working mechanisms were mounted thereon after which the metal chassis was mounted into a plastic housing. Such structure is expensive and furthermore when the external operating parts or a motor are attached to the housing the assembling must be accomplished with very fine tolerance and fine adjustments between the operating parts mounted on the chassis and the other operating parts. Also, the machine becomes heavy because of the sturdy metal chassis used in such prior art devices.

SUMMARY OF THE INVENTION

The present invention eliminates the drawbacks of the prior art by eliminating the metal mounting chassis and provides for the direct mounting of all of the operating parts to the housing body. This allows simplification of the production processes which substantially lowers the production cost while making the housing light and compact. A base which is integrally formed with the plastic housing is provided with at least one wall which folds back upon itself so as to provide mechanical isolation of the base such that the working mechanisms mounted on the isolated base would not be subjected to jar and vibrations.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
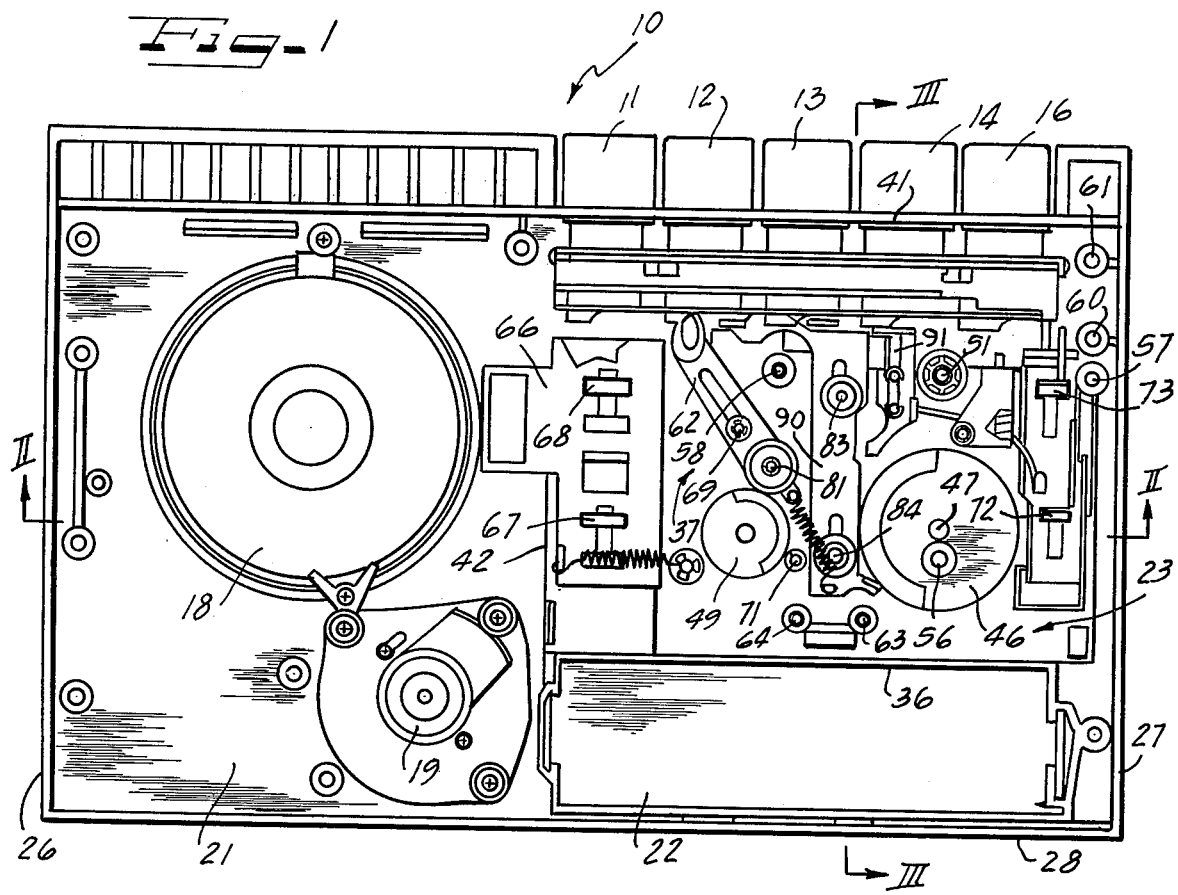
FIG. 1 is a top plan view of the housing according to the invention with the rear cover removed.
Figure 3:
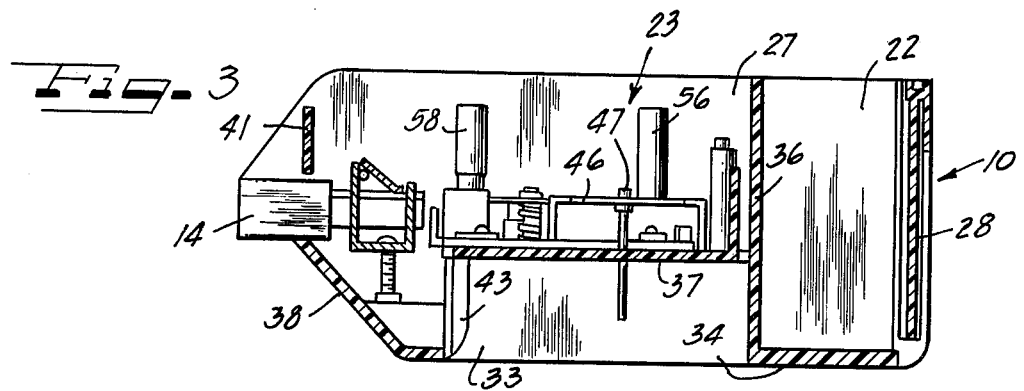
FIG. 3 is a sectional view taken along the line III—III in FIG. 1.

FIG. 1 is a top perspective plan view of the integrally formed chassis and housing of this invention wherein the housing is designated generally by 10 and has a front wall 41 from which extend operating keys 11, 12, 13, 14 and 16. The internal portion of the housing 10 is divided into four general sections with a one section 21 providing a mounting and space for a speaker 18 and a driving motor 19. A battery compartment 22 formed as illustrated in FIGS. 1 and 3 and a portion 23 is provided for directly mounting the operating parts of the tape machine including the rotating mechanism and a magnetic head moving mechanisms as well as the external operating mechanisms.

Figure 2:
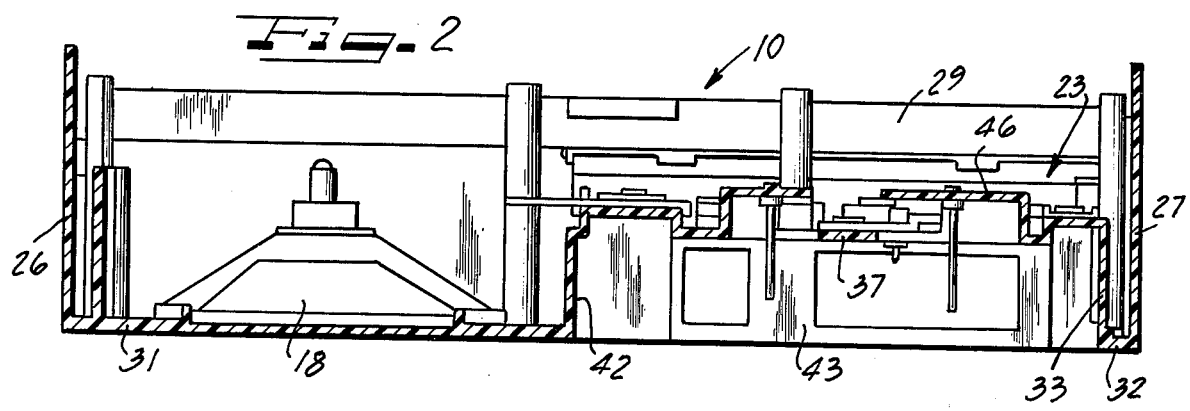
FIG. 2 is a vertical sectional view taken along the line II—II in FIG. 1.

Section 23 comprises a synthetic resin base 37 which is attached to one end wall 27 by a side wall 33 which is joined to the wall 27 by connection 32 as shown in FIG. 2. An internal vertical wall 36 is best illustrated in FIGS. 1 and 3 divides the compartment 23 from the compartment 22 as shown. An intermediate vertical wall 42 as shown in FIG. 2 supports the chassis supporting portion 37 as does the longitudinal vertical extending wall 43 as illustrated in FIG. 2.

The housing 10 is formed including the section 37 with a number of supporting members and standoffs 61, 60, 63 and 64 as well as a number of projection 67, 68, 69, 71, 72 and 73 formed by molding process. In addition, a portion 46 for mounting a tape winding shaft and a portion 49 for mounting a tape feeding shaft as well as a bearing 51 for a capstan shaft are integrally molded in the portion 37 of the housing 10. The capstan shaft which is mounted to the bearing 51 has a friction free pulley that is mounted to the bearing 51 and is axially supported at one end by a separate plate which is supported by the supporting members. Specifically, the separate plate is supported by three supporting members 58, 57 and 56. The relationship between the supporting members 57, 56 and 58 and the bearing 51 is such that the supporting members 57, 56 and 58 form a isosceles triangle and the bearing 51 is mounted at the center of the base of the triangle between the supports 57 and 58.

The push buttons 11 through 16 are mounted so as to actuate various modes of the machine. For example, button 11 is the recording button and a recording and reproducing circuit switch-over lever 66 is actuated by depression of the push button 11 and the lever 66 is mounted directly to the housing 10. A rewind button 12 moves an operating lever 62 and causes a coupling pulley 81 and brake releasing lever 90 to be actuated. The levers 62 and 90 are also directly mounted to the housing 10 by the standoff 69 and support members 83 and 84.

Playback button 13 together with a brake releasing lever 63 causes a head moving lever 91 to be moved. The head moving lever 64 is also mounted on the housing 10.

The button 14 is a fast forward button and when depressed it moves the brake releasing lever 90 to release it. In response to movement of the buttons 12, 13, 14 the motor is coupled to the winding or rewinding shafts as well as to the capstan shaft. The stop button 16 causes all operating parts to return to their inoperative starting position when depressed.

It is seen with this invention that a separate mechanical chassis for mounting the operating parts is not required and instead the mounting and moving structures are directly mounted to a portion of the housing which is integrally formed as shown.

As is seen in FIG. 2 the operating mechanism portion 23 is connected to the wall 27 of the housing 10 by the folded member 33 and connection 32. Thus, distorting and displacement force is applied to the wall 27 will not reach the region 23 due to the isolation caused by the folded structure formed by the members 27, 32 and 33. At least one other side of the area 23 is connected to other sections of the housing 10 by side walls as for example the side wall 36 which separates the battery housing 22 as shown in FIG. 3. Thus, this vertical wall 36 reinforces the section 23 from external jars and distortion. The portion 23 will remain in a very stable condition and will not be distorted due to the isolation provided by the structure of the invention.

Due to the structure of the invention the various connecting parts can be integrally formed in the portion 23 and the operating mechanism can be directly mounted on the portion 23. Direct mounting does not reduce the function or performance of the operating mechanism.

As described in forming the chassis integrally with the housing the chassis is connected to the external housing at least in some regions by a folded plate which serves to absorb external forces. In addition, vertical walls are provided so as to divide compartments and to provide additional reinforcement of certain regions. Thus the chassis is protected from distortion of the housing since it is isolated by the folded plates and the vertical walls. When mounting the operating mechanisms to the chassis for a small compact tape recorder/player due to the special integral structure of the invention the operating elements can be directly mounted on the machine and they will perform with high precision.

It should be realized that the chassis and housing can be integrally molded utilizing synthetic resin material. This allows projections, supporting means and holes for mounting the operating parts to be simultaneously molded during the molding process and they can be very accurately positioned.

According to this invention the total number of mechanical parts is substantially reduced and the cost of producing a small tape recorder/player is maintained low.

It is discovered that the portion 23 can be made a little thicker than the outer plate 27 which will add stability to the portion 23 and thus will provide protection for the portion 23 from external forces which distort the housing.

It is seen that this invention provides a new novel plastic housing and although it has been described with respect to preferred embodiments it is not to be so limited as changes and modifications may be made which are within the full intended scope as defined by the appended claims.

I claim as my invention:

1. A housing for a tape reproducer/recorder maching comprising a molded plastic housing member having external walls, a raised internal chassis portion of said housing member being attached to at least one of said external walls by an internal wall connected to said chassis portion which connects to said one external wall by a connection member to form a double wall structure to isolate said chassis portion from said at least one external wall and at least one other internal wall connecting said raised chassis portion to said housing.

2. A housing for a tape reproducer/recorder machine according to claim 1 including a battery compartment formed in said housing and a common wall between said battery compartment and said raised internal chassis portion which provides support for said chassis portion.

3. A housing for a tape reproducer/recorder machine according to claim 1 including a motor and speaker compartment formed in said housing and a common wall between said motor and speaker compartment and said raised internal chassis portion which supports said chassis portion in said housing.

4. A housing for a small, compact tape reproducer and recorder made of synthetic resin material having end walls and which uses a raised portion of the housing as a chassis for mounting the operating parts of said recorder wherein at least one side of the raised portion is isolated from at least one of the housing walls by a connection member between a base of said raised portion and a base of the housing wall to form a folded structure and at least one other side of the raised portion being attached by an internal vertical wall to the housing and said vertical wall also serving as a dividing wall for other sections of the housing.

5. A housing adapted for a small, compact tape recorder comprising:
   a. a molded plastic housing member having an internal surface and end walls surrounding the internal surface;
   b. a raised portion of the housing serving as a chassis for mounting operating parts of said tape recorder;
   c. a U-shaped folded wall structure for vibration isolation comprising a first internal wall supporting said raised portion and a connection element connected between one of said end walls and said first internal wall; and
   d. second and third internal walls supporting said raised portion and separating said chassis from other parts of the tape recorder within said housing member.

* * * * *